(12) United States Patent
Wackerly

(10) Patent No.: US 7,684,410 B2
(45) Date of Patent: Mar. 23, 2010

(54) VLAN AWARE TRUNKS

(75) Inventor: Shaun C. Wackerly, Lincoln, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 614 days.

(21) Appl. No.: 11/590,050

(22) Filed: Oct. 31, 2006

(65) Prior Publication Data

US 2008/0101387 A1    May 1, 2008

(51) Int. Cl.
*H04L 12/28* (2006.01)
*H04L 12/56* (2006.01)
*G06F 15/173* (2006.01)

(52) U.S. Cl. .................. 370/395.53; 370/389; 370/392; 370/401; 709/224; 709/239

(58) Field of Classification Search ............. 370/395.53
See application file for complete search history.

(56) References Cited

U.S. PATENT DOCUMENTS

| | | | |
|---|---|---|---|
| 6,445,715 B1 | 9/2002 | Annaamalai et al. | |
| 6,775,283 B1 | 8/2004 | Williams | |
| 2003/0152075 A1* | 8/2003 | Hawthorne et al. | 370/389 |
| 2005/0141567 A1* | 6/2005 | Jaber et al. | 370/537 |
| 2006/0029055 A1* | 2/2006 | Perera et al. | 370/386 |
| 2006/0126616 A1* | 6/2006 | Bhatia | 370/389 |
| 2007/0071011 A1* | 3/2007 | de Heer et al. | 370/395.53 |

* cited by examiner

*Primary Examiner*—William Trost, IV
*Assistant Examiner*—Andrew Chriss

(57) ABSTRACT

Dynamically enable link aggregation control protocol on a per port and per virtual local area network (VLAN) basis.

19 Claims, 5 Drawing Sheets

VLAN AWARE TRUNKS

BACKGROUND

Computing networks can include multiple network devices such as routers, switches, hubs, servers, desktop PCs, laptops, and workstations, among other peripheral devices, e.g., printers, facsimile devices, and scanners, networked together across a local area network (LAN) and/or wide area network (WAN).

In addition to physical connections, networks often form virtual, e.g., logical connections. A virtual LAN (VLAN) is a logical subgroup within a LAN that is created via software rather than manually moving cables in the wiring closet. It combines user stations and network devices into a single unit regardless of the physical LAN segment to which they are attached and allows traffic to flow more efficiently within populations of mutual interest.

VLANs are implemented in port switching hubs and LAN switches and generally offer proprietary solutions. VLANs reduce the time it takes to implement connection moves, additions and changes. VLANs function at layer 2 of the open system interconnection (OSI) protocol stack. The OSI protocol stack is one example of the set of protocols used in a communications network. A protocol stack is a prescribed hierarchy of software layers, starting from the application layer at the top (the source of the data being sent) to the physical layer at the bottom (transmitting the bits on the wire). The stack resides in each client and server, and the layered approach lets different protocols be swapped in and out to accommodate different network architectures. Layer 2 is the data link layer. Layer 2 is responsible for node to node validity and integrity of the transmission. The transmitted bits are divided into frames; for example, an Ethernet, Token Ring or FDDI frame in local area networks (LANs).

Link aggregation control protocol (LACP) is a standard in IEEE 802.3ad which defines a method of aggregating links together to form a more redundant link with larger bandwidth. An aggregate link, also known as a "trunk", is formed either manually or dynamically. A manual trunk comes into existence when a network administrator physically configures LACP on multiple network devices that are connected together with a set of links, e.g., physical (Layer 1) connections. A dynamic trunk can come into existence when an administrator has previously configured multiple network devices to support "dynamic" LACP, and when two or more links are connected between the switches.

One issue with LACP is that manual trunks are configured on a per port basis, so when a link is moved from one port to another a reconfiguration has to take place. This involves administration action, which may be costly and prone to human error. One issue with dynamic trunks is that the trunk becomes a member of the default VLAN when it is formed and may have no awareness of VLANs on a given device. With previous LACP approaches the dynamic trunks are restricted to the default VLAN which means that ports which were previously either "tagged" or "untagged" members of multiple VLANs may lose this previous membership. This fact becomes a drawback in modern multiple VLAN environments.

DETAILED DESCRIPTION

According to various embodiments network devices, systems and methods are provided, including executable instructions for virtual local area network (VLAN) trunks. One embodiment includes a network device having a processor in communication with a memory and a network chip having a number of network ports. Computer executable instructions are storable in the memory and executable by the processor to dynamically enable link aggregation control protocol (LACP) on a per port and per virtual local area network (VLAN) basis.

According to various embodiments, network chips (e.g., application specific integrated circuits (ASICs)) include a number of network ports and logic associated with the device for the purpose of exchanging packets with the processor responsible for processing the packets. In effect, the ports to a network chip operate at the layer 2/layer 1 levels of the protocol stack, e.g., logic link control/media access control-physical layers (MAC-PHY) and includes logic circuitry associated therewith to achieve the embodiments described herein.

Figure 1:
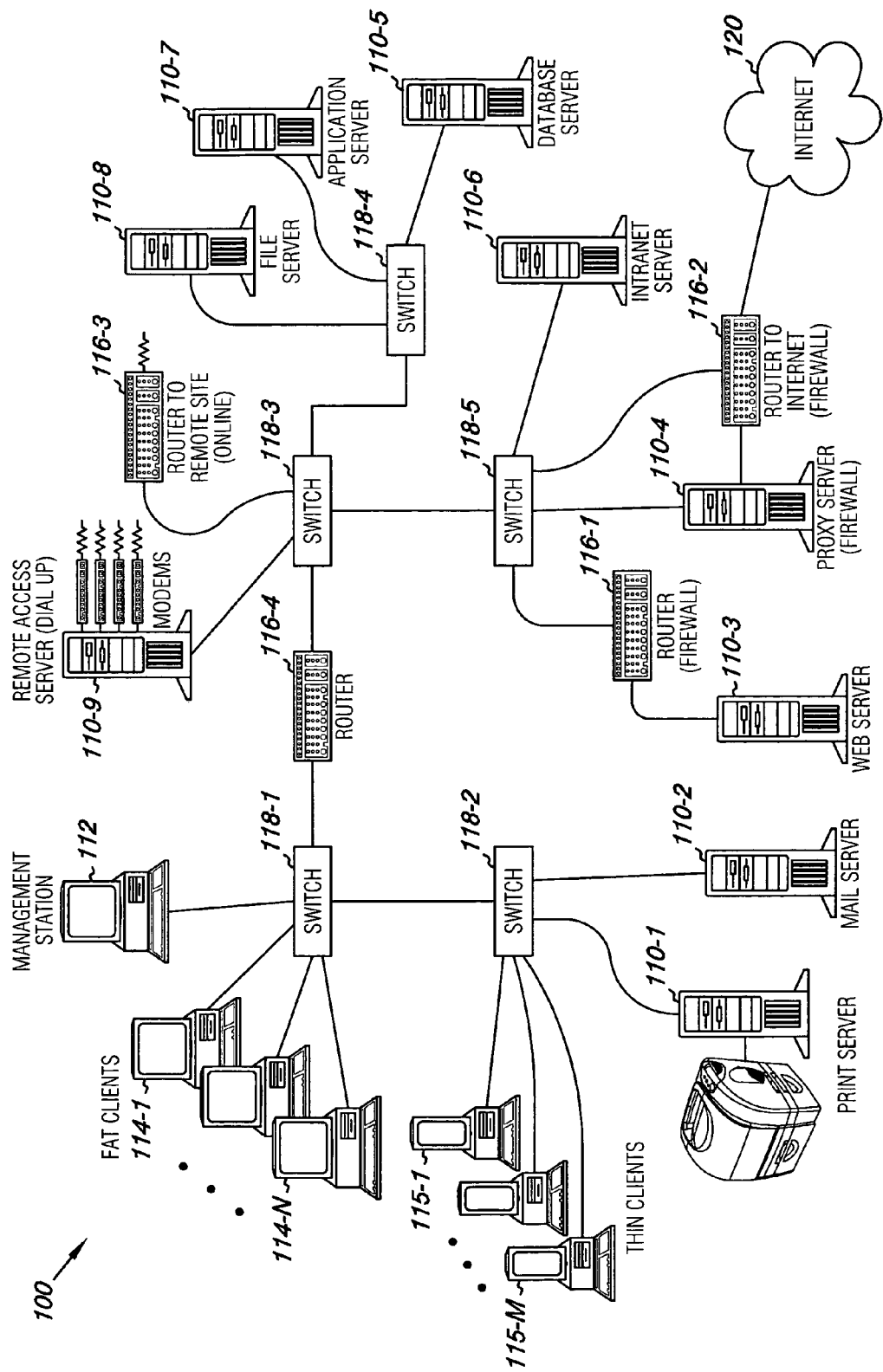
FIG. 1 is an embodiment of a computing device network.

FIG. 1 is an embodiment of a computing device network 100. As shown in FIG. 1, a number of devices, e.g., PCs, servers, peripherals, etc., can be networked together via a LAN and/or WAN via routers, hubs, switches, and the like (referred to herein as "network devices"). The embodiment of FIG. 1 illustrates clients and servers in a LAN. However, embodiments of the invention are not so limited. For example, the embodiment of FIG. 1 shows various servers for various types of service on a LAN.

The exemplary network of FIG. 1 illustrates a print server 110-1, a mail server 110-2, a web server 110-3, a proxy server (firewall) 110-4, a database server 110-5, and intranet server 110-6, an application server 110-7, a file server 110-8, and a remote access server (dial up) 110-9. Again, the examples provided here do not provide an exhaustive list. The embodiment of FIG. 1 further illustrates a network management server 112, e.g., a PC or workstation, a number of "fat" clients 114-1, . . . , 114-N which can also include PCs and workstations and/or laptops, and a number of "thin" clients 115-1, . . . , 115-M which can include terminals and/or peripherals such as scanners, facsimile devices, handheld multi-function device, and the like.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1, 118-2, 118-3, 118-4, and 118-5. Embodiments of the invention, however, are not limited to the number and/or type of network devices in FIG. 1's illustration.

As one of ordinary skill in the art will appreciate, many of these devices include processor and memory hardware. By way of example and not by way of limitation, the network management server 112 will include a processor and memory. Similarly, the network devices of routers, 116-1, 116-2, 116-3, and 116-4, and hubs and/or switches 118-1, 118-2, 118-3, 118-4, and 118-5 may include processor and memory resources. Embodiments of the invention are not limited, for the various devices in the network, to the number, type, or size of processor and memory resources.

Computer executable instructions (e.g., computer executable instructions), as described in more detail below, can reside on the various network devices. For example, computer executable instructions in the form of firmware, software, etc., can be resident on the network 100 in the memory of a network management server 112 and/or one or more routers, 116-1, 116-2, 116-3, and 116-4, and hubs and/or switches 118-1, 118-2, 118-3, 118-4, and 118-5, and be executable by the processor(s) thereon. As the reader will appreciate, computer executable instructions can be resident in a number of locations on various network devices in the network 100 as employed in a distributed computing network.

As one of ordinary skill in the art will appreciate, each network device in the network is associated with a port of a switch to which it is connected. Data frames, or packets, are transferred between network devices by means of a switch's logic link control (LLC)/media access control (MAC) circuitry, or "engines", associated with each switch port. The network switch passes data frames received from a transmitting network device to a destination network device based on the header information in the received data frame. The switch can also link a given network to other networks through one or more pre-designated switch ports.

Figure 2:
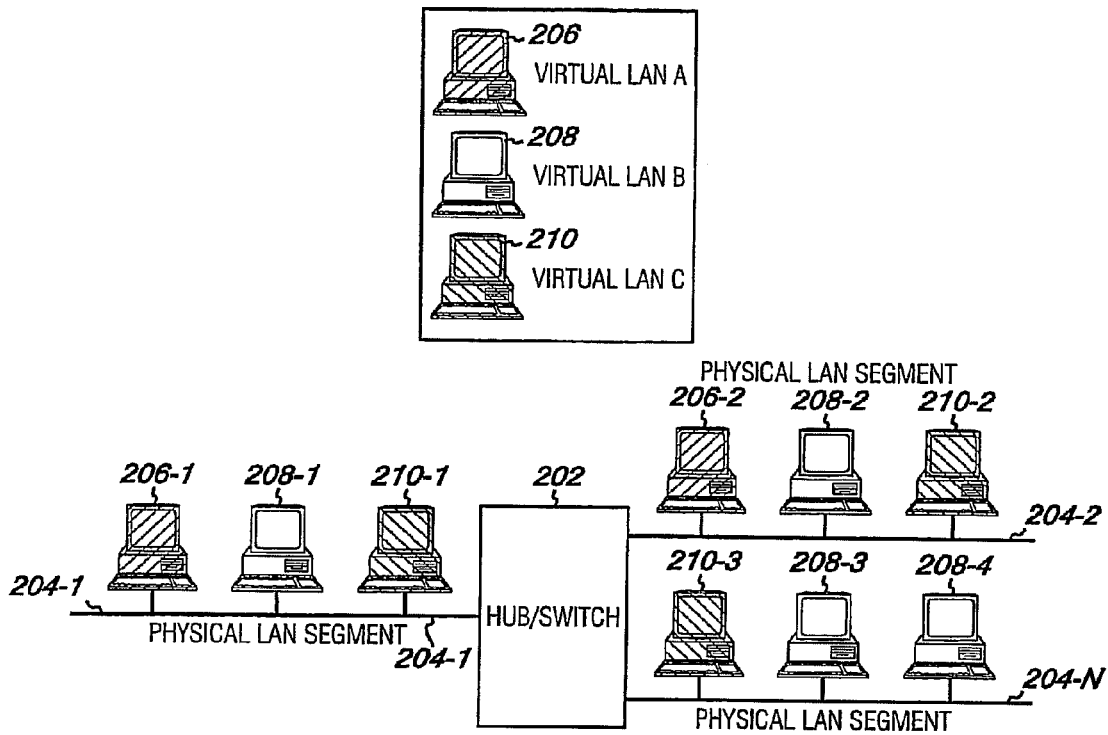
FIG. 2 is an illustration showing various VLAN logical subgroups relative to various physical LAN segments to which multiple network devices are attached.

FIG. 2 is an illustration showing various VLAN logical subgroups, e.g., virtual LAN A 206, virtual LAN B 208, virtual LAN C 210, relative to various physical LAN segments, e.g., 204-1, 204-2, . . . , 204-N, to which multiple network devices, e.g., 206-1, 206-2, 208-1, 208-2, 208-3, 208-4, 210-1, 210-2, 210-3, are attached. One feature of packet switches, e.g., 202, used in LAN applications, such as Ethernet switches, is that the switches 202 actually can segregate a network into a number of virtual local area networks (VLANs), e.g., virtual LAN A 206, virtual LAN B 208, virtual LAN C 210. In the VLAN mode of operation, the switches, e.g., 202, of a packet network transport frames or packets back and forth between network devices, e.g., 206-1, 206-2, 208-1, 208-2, 208-3, 208-4, 210-1, 210-2, 210-3, designated as members of a particular VLAN, e.g., virtual LAN A 206, virtual LAN B 208, virtual LAN C 210. The switches, e.g., switch 202, of the network do not transport the packets for the VLAN members, e.g., virtual LAN A 206, virtual LAN B 208, virtual LAN C 210, to other network devices, e.g., 206-1, 206-2, 208-1, 208-2, 208-3, 208-4, 210-1, 210-2, 210-3 not belonging to that particular LAN. In other words, switch 202 will transport packets for VLAN A member 206 to network devices 206-1, and 206-2, but not others. Switch 202 will transport packets for VLAN B 208 to network devices 208-2, 208-2, 208-3, and 208-4, but not others. And, switch 202 will transport packets for VLAN C 201 to network devices 210-1, 210-2, and 210-3, but not others.

In this manner, the capability exists for creating logical workgroups of users and their shared resources (servers, printers, etc.), which may be physically separated from each other. Members of a workgroup may be coupled directly with one switch in the LAN, while other members or equipment of the workgroup may be coupled to one or more remote networks that are linked to the switch at a designated port. VLAN groupings, e.g., virtual LAN A 206, virtual LAN B 208, virtual LAN C 210, can provide privacy and security to their members while enabling "broadcast domains" whereby broadcast traffic is kept "inside the VLAN, e.g., virtual LAN A 206, virtual LAN B 208, virtual LAN C 210.

As the reader will appreciate, where a given switch, e.g., 202, implements two or more VLANs, e.g., virtual LAN A 206, virtual LAN B 208, virtual LAN C 210, the switch, e.g., 202 has to distinguish packets for members of one VLAN from packets for members of a different VLAN and from packets for devices not associated with any one VLAN. All VLAN frames may be tagged with data identifying the particular VLANS. Hence, data packets communicating within a VLAN, e.g., virtual LAN A 206, virtual LAN B 208, virtual LAN C 210, may contain information that identifies the VLAN grouping, or VLAN type, and the particular VLAN ID. Such information, or "tag," is provided as additional fields in the frame header. The frame format for such packets is expanded relative to the standard frame format. For example, the IEEE 802.3ac-1998 supplement to the Ethernet ANSI/IEEE 802.3 standard (1998 Edition) specifies the tagged and untagged frame formats, and the P802.1Q Draft standard specifies the semantics of tagged frames. As the reader will appreciate, according to these formats a port may tagged on a number of VLANs, but untagged on only one VLAN.

In some network implementations, all of the devices including the destination network devices of the network may process VLAN tags. However, in many cases, the destination network devices on the network do not process VLAN tags. Where all legs of the VLAN are served through one switch, the switch may distinguish the packets simply by receiving and sending packets over the links designated for the respective VLAN, without VLAN tags. However, where the VLANs extend through two or more switches, the frames or packets for each VLAN must be tagged, particularly on the links between switches. One of ordinary skill in the art will appreciate the manner in which computer executable instructions stored in a memory of a switch can be executed by processor resources of the switch to establish VLANS and tags as described in connection with FIG. 2.

As one of ordinary skill the art will understand, embodiments of the present disclosure can be performed by software, application modules, and computer executable instructions, stored in memory and executable by processor resources, on the systems and devices shown herein or otherwise. The embodiments, however, are not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments can occur or be performed at the same point in time.

Figure 3:
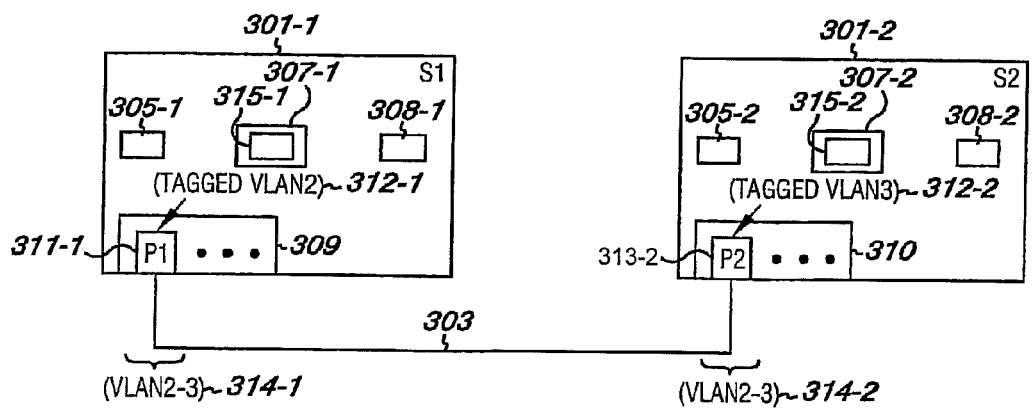
FIG. 3 illustrates an embodiment of VLAN aware dynamic LACP trunk formation according to this disclosure.
Figure 4:
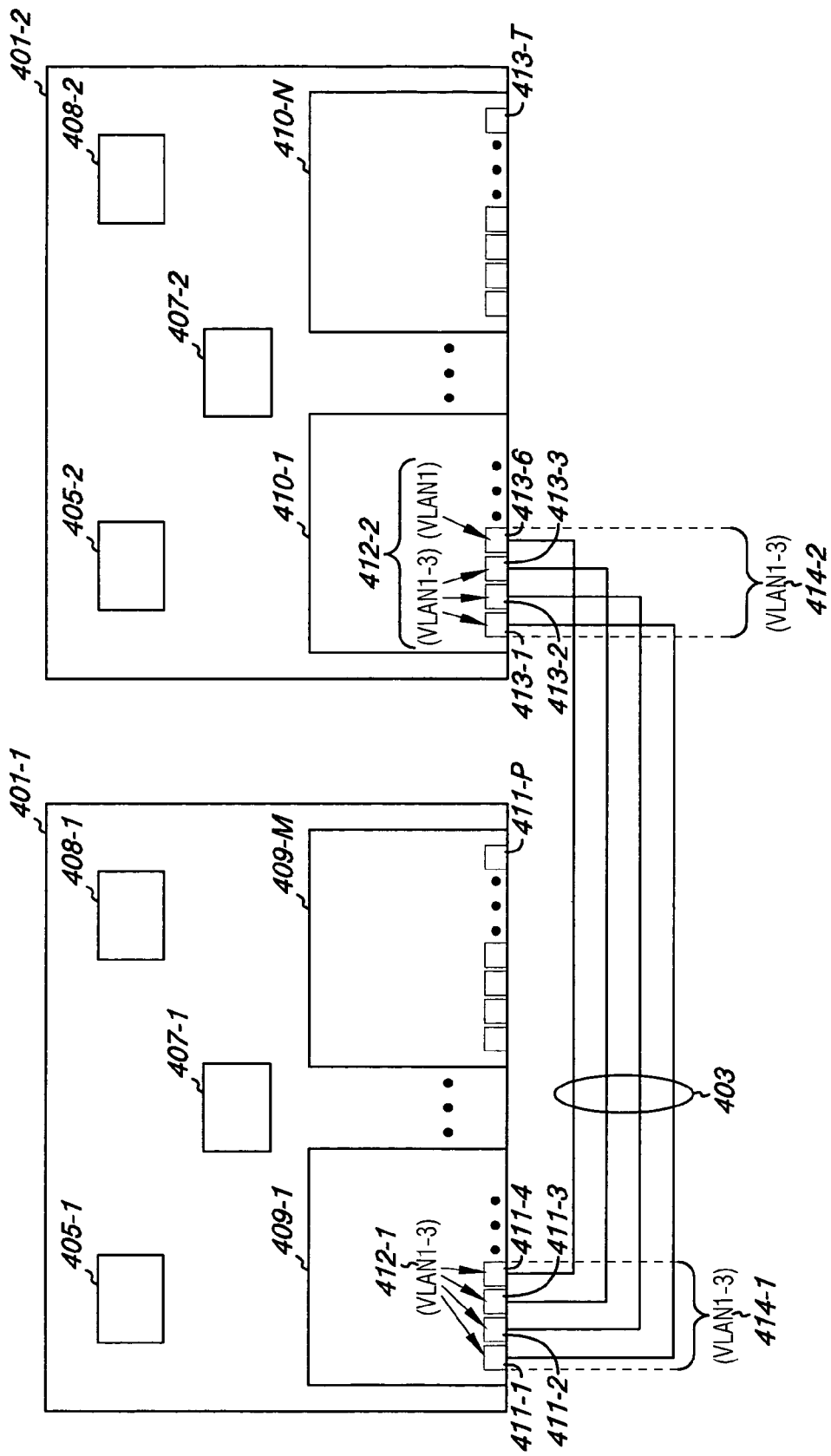
FIG. 4 illustrates another embodiment of VLAN aware dynamic LACP trunk formation according to this disclosure.
Figure 5:
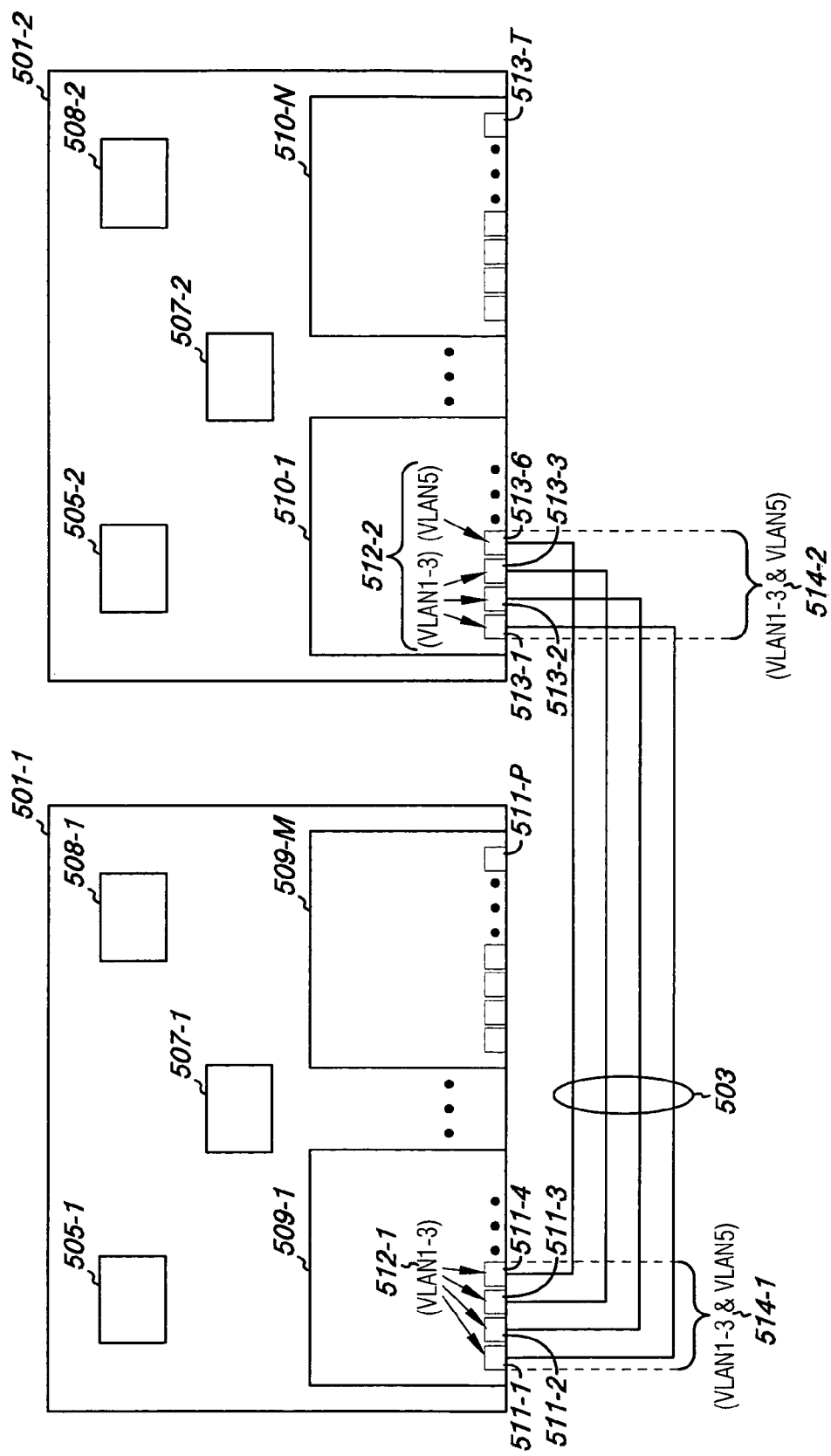
FIG. 5 illustrates another embodiment of VLAN aware dynamic LACP trunk formation according to this disclosure.

FIG. 3 illustrates an embodiment of VLAN aware dynamic LACP trunk formation according to this disclosure. The embodiment of FIG. 3 illustrates a pair of switches (S1 and S2), 301-1 and 301-2, respectively, connected via a physical link 303 as can exist within a network such as the network shown in FIG. 1. As shown in FIG. 3, the switches 301-1 (S1) and 301-2 (S2) include processor and memory resources, 305-1/307-1 and 305-2/307-2 respectively, and logic circuitry associated with a network chip (ASIC), e.g., 309 and 310, each having a number of physical ports, e.g., 311-1, . . . , 313-2, etc. While FIGS. 3-5 are discussed in reference to network switches, one of ordinary skill in the art will appreciate embodiments of the present disclosure are not limited to implementation on network switches, e.g., network management servers and software may benefit from the features described herein.

In the embodiment shown in FIG. 3, a port 311-1 (P1) on a switch 301-1 (S1) has a physical link connection 303, e.g., "brought up" by physical connection, with a port 313-2 (P2) of switch 301-2 (S2). As shown in the example embodiment of FIG. 3, port 311-1 (P1) of switch 301-1 (S1) has been "tagged" with membership in VLAN 2 and port 313-2 (P2) of switch 301-2 (S2) has been tagged with membership in VLAN 3. That is, a first port (P1) on a first network device (S2) has been tagged with membership in a first VLAN, e.g., VLAN 2, and a second port (P2) on a second network device (S2) has been tagged with membership in a second VLAN, e.g., VLAN 3. One of ordinary skill in the art will appreciate upon reading this disclosure the manner in which various ports, e.g., port 311-1 (P1) and port 313-2 (P2), associated with a given switch, e.g., switch 301-1 (S1) and switch 301-2 (S2) may be "tagged" with membership in a particular VLAN. For example, a particular port may be tagged with membership in a particular VLAN by execution of software, firmware, and/or user, e.g., network administrator, physical configuration.

As mentioned above, link aggregation control protocol (LACP) is a standard in IEEE 802.3ad which defines a method of aggregating links together to form a more redundant link with larger bandwidth. An aggregate link, also known as a "trunk", is formed either manually or dynamically. A manual trunk comes into existence when a network administrator physically configures LACP on multiple network devices that are connected together with a set of links, e.g., physical (Layer 1) connections. A dynamic trunk can come into existence when an administrator has previously configured multiple network devices to support "dynamic" LACP, and when two or more links are connected between the switches. LACP may be implemented by executable instructions as part of a LACP engine located on a switch, e.g., 308-1 and 308-2 as shown in FIG. 3, as the same will be known by one of ordinary skill in the art.

One issue with LACP is that manual trunks are configured on a per port basis, so when a link is moved from one port to another a reconfiguration has to take place. This involves administration action, which may be costly and prone to human error. One issue with dynamic trunks is that the trunk becomes a member of the default VLAN when it is formed. With previous LACP approaches the dynamic trunks are restricted to the default VLAN which means that ports which were previously either "tagged" or "untagged" members of multiple VLANs may lose this previous membership. This fact becomes a drawback in modern multiple VLAN environments.

Accordingly, embodiments of the present invention include computer executable instructions which may be stored in the memory resource, e.g., 307-1/307-2, of a given switch, e.g., switch 301-1 (S1) and switch 301-2 (S2), or elsewhere, and be executed by the processor resource, e.g., 305-1/305-2, of a switch, e.g., switch 301-1 (S1) and switch 301-2 (S2), or elsewhere, to perform the actions described herein.

In one embodiment, a switch may allow LACP to run as in previous implementations of LACP engines with the addition that when LACP generates a dynamic trunk, computer executable instructions on the switch are executed to compare the ports in the dynamic trunk to the switch's configuration file, e.g., 315-1 and 315-2, stored in memory, e.g., 307-1 and 307-2. If all the ports in the dynamic trunk are part, e.g., members, of the same VLAN, the computer executable instructions are executed to make the dynamic trunk a member of that VLAN instead of the default VLAN. In this manner, no ports are moved out of the VLANs for which they are configured.

Also according to embodiments, e.g., where all ports to a switch are not members of the same VLAN or where ports are tagged on multiple VLANs, computer executable instructions stored in the memory of a switch are executed by the processor resources of the switch to run an instance of LACP on each VLAN configured on the switch, effectively producing a per VLAN LACP. According to embodiments, when a dynamic trunk is created by an LACP instance on a particular VLAN, e.g., VLAN "X", computer executable instructions are executed which cause the dynamic trunk to be made a member of VLAN X (retaining the taggedness of the original port). Computer executable instructions are also executed which make this feature active on all ports of a given switch by default, e.g., port 311-1 (P1) of switch 301-1 and port 313-2 (P2) of switch 301-2. Thus, embodiments include computer executable instructions which can be stored in memory of a switch and executed by processor resources of the switch to dynamically enable LACP on a per port and per VLAN basis. As used in this disclosure, this feature capability of the embodiments to dynamically enable LACP on a per port and per VLAN basis will be referred to as "VLACP". Each port can now participate in a dynamically enabled LACP trunk on a given VLAN since the computer executable instructions have executed to enable dynamic LACP on each port that wishes to participate in a dynamically enabled LACP trunk for the given VLAN and the VLAN in which the port resides. This action does not create any particular issues since no ports will be moved out, e.g., have membership removed, of the VLANs for which they are configured.

According to embodiments, VLACP uses the framework of LACP to decide whether two ports should be a part of the same trunk. This framework places two ports in the same trunk if the two ports connect to the same device. The framework of LACP will not make two ports part of the same trunk if the two ports connect to different devices.

In the example embodiment shown in FIG. 3, when ports 311-1 and 313-2 are "brought up", i.e., gets a physical link 303, computer executable instructions are executed to enable VLACP on these ports 311-1 and 313-2. As such, each VLAN for which ports 311-1 and 313-2 are either a tagged, e.g., VLAN 2 and VLAN3 (312-1/312-2) respectively, or untagged member may form its own VLACP trunk. This means that a given port 311-1 and 313-2 may be a member of multiple VLACP trunks if the given port 311-1 and 313-2 is a member of multiple VLANs. However, each VLAN will have just one VLACP trunk so that a given port 311-1 and 313-2 will not be a member of multiple VLACP trunks on the same VLAN.

In FIG. 3, when a dynamic trunk is created by an LACP instance on VLAN 2, computer executable instructions are executed to cause the VLACP trunk to be made a member of VLAN 2. Similarly, when a dynamic trunk is created by an LACP instance on VLAN 3, computer executable instructions are executed to cause the VLACP trunk to be made a member of VLAN 3. When a port, e.g., 311-1 and 313-2, is "brought up", i.e., gets a physical link 303, computer executable instructions are executed perform the following for each VLAN in which the port is a member, e.g., VLAN 2 for port 311-1 (P1) and VLAN 3 for port 313-2 (P2). Computer executable instructions are executed such that the port 311-1 (P1) is added to VLAN 2's VLACP trunk and port 313-2 is added to the VLAN 3's VLACP trunk. As the reader will appreciate, if the LACP framework determines that port 311-1 (P1) and port 313-2 (P2) are connected to the same network device and should be a part of a trunk, then computer executable instructions are executed to add taggedness in VLAN 3 to port 311-1 (P1) without changing or removing the 311-1's taggedness in VLAN 2. Similarly, computer executable instructions are executed to add taggedness in VLAN 2 to port 313-2 without changing or removing port 313-2's taggedness in VLAN 3. The same is illustrated in the example embodiment of FIG. 3 at 314-1 and 314-2. As the reader will appreciate, the computer executable instructions can also be executed such that VLACP will change a port from untagged to tagged. However, computer executable instructions associated with the VLACP will not change a port from tagged to untagged. As the reader will appreciate, if only one port exists in a trunk, no trunk is formed and the network devices, e.g., switch 301-1 (S1) and switch 301-2 (S2), will operate as if VLACP were not running.

FIG. 4 illustrates another embodiment of VLAN aware dynamic LACP trunk formation according to this disclosure. The embodiment of FIG. 4 illustrates a pair of switches (S1 and S2), 401-1 and 401-2, respectively, connected via a physical link 403 as can exist within a network such as the network shown in FIG. 1. The switches 401-1 (S1) and 401-2 (S2) include processor and memory resources, 405-1/407-1 and 405-2/407-2 respectively, and logic circuitry associated with a network chip (ASIC), e.g., 409-1, . . . , 409-M and 410-1, . . . , 410-N, each having a number of physical ports, e.g., 411-1, . . . , 413-T, etc. The designators "M" and "N" are used to illustrate that various switches in a network may support or contain different number of chips. Accordingly, various switches in a network may support a different number of ports. Hence, in this example embodiment, switch 401-1 is illustrated having ports 411-1, . . . , 411-P and switch 401-2 is illustrated having ports 413-1, . . . , 413-T. In the embodiment of FIG. 4 the number of switches 401-1 (S1) and 401-2 (S2) each also have LACP engine resources, 408-1 and 408-2, which can execute instructions to provide LACP functionality as the same will be known and understood by one of ordinary skill in the art.

In the embodiment shown in FIG. 4, ports 411-1, 411-2, 411-3, and 411-4 on a switch 401-1 (S1) have been given a physical link connection 403, e.g., "brought up" by physical connection, with ports 413-1, 413-2, 413-3, and 413-6 of switch 401-2 (S2). As shown in the example embodiment of FIG. 4, ports 411-1, 411-2, 411-3, and 411-4 of switch 401-1 (S1) have been "tagged" with membership in VLANs 1-3 (shown at 412-1), ports 413-1, 413-2, and 413-3, of switch 401-2 (S2) have been tagged with membership in VLANs 1-3, and port and 413-6 has been tagged with membership in VLAN 1 (shown at 412-2).

In the example embodiment shown in FIG. 4, when ports 411-1, 411-2, 411-3, 411-4 and 413-1, 413-2, 413-3, and 413-6 are given physical link 403, computer executable instructions are executed to enable VLACP on these ports. As such, each VLAN for which ports 411-1, 411-2, 411-3, 411-4 and 413-1, 413-2, 413-3, and 413-6 are either a tagged, e.g., VLANs 1-3 and VLAN 1, or untagged member may form its own VLACP trunk. Hence ports 411-1, 411-2, 411-3, 411-4 and 413-1, 413-2, 413-3, and 413-6 may be a member of multiple VLACP trunks since certain ones of the ports are members of multiple VLANs. Each VLAN will have just one VLACP trunk so that a given port will not be a member of multiple VLACP trunks on the same VLAN.

In FIG. 4, when a dynamic trunk is created by an LACP instance on VLAN 1, computer executable instructions are executed to cause the VLACP trunk to be made a member of VLAN 1. When a dynamic trunk is created by an LACP instance on VLAN 2, computer executable instructions are executed to cause the VLACP trunk to be made a member of VLAN 2. And, when a dynamic trunk is created by an LACP instance on VLAN 3, computer executable instructions are executed to cause the VLACP trunk to be made a member of VLAN3.

When a ports 411-1, 411-2, 411-3, 411-4 and 413-1, 413-2, 413-3, and 413-6 are given physical link 403, computer executable instructions are executed perform the following for each VLAN in which the port is a member, e.g., VLANs 1-3 for ports 411-1, 411-2, 411-3, 411-4 and 413-1, 413-2, 413-3 and VLAN 1 for port 413-6. Computer executable instructions are executed such that the ports 411-1, 411-2, 411-3, 411-4 and 413-1, 413-2, 413-3 are added to the VLACP trunk for VLAN 1, VLAN 2 and VLAN 3 and such that port 413-6 is added to the VLACP trunk for VLAN 1. As the reader will appreciate, if the LACP framework determines that port 411-4 and port 413-6 are connected to the same network device and should be a part of a dynamic trunk, then computer executable instructions are executed to add raggedness in VLAN 2 and VLAN 3 to port 413-6 without changing or removing port 413-6's original taggedness in VLAN 1. Similarly, computer executable instructions are executed to maintain taggedness for ports 411-1, 411-2, 411-3, 411-4 in VLAN 1, VLAN 2, and VLAN 3. The same is illustrated in the example embodiment of FIG. 4 at 414-1 and 414-2. Hence, in this example embodiment, 3 VLACP trunks (e.g., virtual links) are represented, one for each of VLAN 1, VLAN 2, and VLAN 3, with 4 ports tagged for membership in each of the 3 VLACP trunks on each switch, e.g., ports 411-1, 411-2, 411-3, 411-4 on switch 401-1 and ports 413-1, 413-2, 413-3, 413-6 on switch 401-2. Again, as the reader will appreciate, the computer executable instructions can also be executed such that VLACP will change a port from untagged to tagged. However, computer executable instructions associated with the VLACP will not change a port from tagged to untagged or remove a taggedness of a port.

According to embodiments, if physical link is provided to switch 401-1 (e.g., a first network device) and switch 401-2 (e.g., a second network device) and the switches 401-1 and 401-2 support a different number of ports per trunk, e.g., switch 401-2 supports a greater number of ports per trunk than switch 401-1, then computer executable instructions are executed to form a larger trunk on the network device that supports the larger number of ports, e.g., switch 401-2. The computer executable instructions are also executed to remove a quantity of ports exceeding the number of ports supported by the network device supporting fewer ports per trunk and place the removed quantity of ports in inactive mode. Hence if switch 401-2 can support 16 ports in a given VLACP trunk and switch 401-1 can only support 8 ports in a given VLACP trunk then the larger VLACP trunk will be formed on switch 401-2 and the quantity of ports in the VLACP trunk on switch 401-2 above 8 will be placed in inactive mode. According to various embodiments, the computer executable instructions are executed to remove a port with a lowest speed when removing a quantity of ports exceeding the number of ports supported by a given network device and execute such that when a port goes down in the larger trunk an inactive port is moved to active mode to take its place.

Hence, if more ports exist in a VLACP trunk than the number of ports supported by a given switch e.g., switch 401-2 supports a greater number of ports per trunk than switch 401-1, then the computer executable instructions are executed to remove the quantity of ports exceeding the number of ports supported by switch 401-1. According to embodiments, computer executable instructions are executed to remove ports with the lowest speed. If a new port to be added to a VLACP trunk has the lowest speed, then the computer executable instructions are executed to choose this port for removal. The computer executable instructions are executed to place ports in an "inactive" mode when they are removed from a VLACP. The computer executable instructions are also executed such that when a port in the VLACP trunk goes down an "inactive" port will be made active to take its place. As such a VLACP trunk for each VLAN will have from two (2) up to the total number of ports supported by a given switch, or the VLAN will not have a VLACP trunk present. As the reader will appreciate, all VLACP trunks are tagged.

FIG. 5 illustrates another embodiment of VLAN aware dynamic LACP trunk formation according to this disclosure. The embodiment of FIG. 5 illustrates a pair of switches (S1 and S2), 501-1 and 501-2, respectively, connected via a physical link 503 as can exist within a network such as the network shown in FIG. 1. The switches 501-1 (S1) and 501-2 (S2) include processor and memory resources, 505-1/507-1 and 505-2/507-2 respectively, and logic circuitry associated with a network chip (ASIC), e.g., 509-1, . . . , 509-M and 510-1, . . . , 510-N, each having a number of physical ports, e.g., 511-1, . . . , 513-T, etc. The designators "M" and "N" are used to illustrate that various switches in a network may support or contain different number of chips. Accordingly, various switches in a network may support a different number of ports. Hence, in this example embodiment, switch 501-1 is illustrated having ports 511-1, . . . , 511-P and switch 501-2 is illustrated having ports 513-1, . . . , 513-T. In the embodiment of FIG. 5 the number of switches 501-1 (S1) and 501-2 (S2) each also have LACP engine resources, 508-1 and 508-2, which can execute instructions to provide LACP functionality.

In the embodiment shown in FIG. 5, ports 511-1, 511-2, 511-3, and 511-4 on a switch 501-1 (S1) have been given a physical link connection 503 with ports 513-1, 513-2, 513-3, and 513-6 of switch 501-2 (S2). As shown in the example embodiment of FIG. 5, ports 511-1, 511-2, 511-3, and 511-4 of switch 501-1 (S1) have been "tagged" with membership in VLANs 1-3 (shown at 512-1), ports 513-1, 513-2, and 513-3, of switch 501-2 (S2) have been tagged with membership in VLANs 1-3, and port and 513-6 has been tagged with membership in VLAN 5 (shown at 512-2).

In the example embodiment shown in FIG. 5, when ports 511-1, 511-2, 511-3, 511-4 and 513-1, 513-2, 513-3, and 513-6 are given physical link 503, computer executable instructions are executed to enable VLACP on these ports. As such, each VLAN for which ports 511-1, 511-2, 511-3, 511-4 and 513-1, 513-2, 513-3, and 513-6 are either a tagged, e.g., VLANs 1-3 and VLAN 5, or untagged member may form its own VLACP trunk. Again in this example embodiment ports 511-1, 511-2, 511-3, 511-4 and 513-1, 513-2, 513-3, and 513-6 may be a member of multiple VLACP trunks since certain ones of the ports are members of multiple VLANs.

In FIG. 5, when a dynamic trunk is created by an LACP instance on VLAN 1, computer executable instructions are executed to cause the VLACP trunk to be made a member of VLAN 1. When a dynamic trunk is created by an LACP instance on VLAN 2, computer executable instructions are executed to cause the VLACP trunk to be made a member of VLAN 2. When a dynamic trunk is created by an LACP instance on VLAN 3, computer executable instructions are executed to cause the VLACP trunk to be made a member of VLAN 3. And, when a dynamic trunk is created by an LACP instance on VLAN 5, computer executable instructions are executed to cause the VLACP trunk to be made a member of VLAN 5.

When a ports 511-1, 511-2, 511-3, 511-4 and 513-1, 513-2, 513-3, and 513-6 are given physical link 503, computer executable instructions are executed to perform the following for each VLAN in which the port is a member, e.g., VLANs 1-3 for ports 511-1, 511-2, 511-3, 511-4 and 513-1, 513-2, 513-3 and VLAN 5 for port 513-6. Computer executable instructions are executed such that the ports 511-1, 511-2, 511-3, 511-4 and 513-1, 513-2, 513-3 are added to the VLACP trunk for VLAN 1, VLAN 2 and VLAN 3 and such that port 513-6 is added to the VLACP trunk for VLAN 5.

As the reader will appreciate, if the LACP framework determines that port 511-4 and port 513-6 are connected to the same network device and should be a part of a dynamic trunk, then computer executable instructions are executed to add taggedness in VLAN 1, VLAN 2, and VLAN 3 to port 513-6 without changing or removing the port 513-6's original taggedness in VLAN 5. Similarly, computer executable instructions are executed to add taggedness in VLAN 5 to ports 511-1, 511-2, 511-3, and 511-4 without changing or removing ports 511-1, 511-2, 511-3, and 511-4 taggedness in VLANs 1-3. Additionally, computer executable instructions are executed to add taggedness in VLAN 5 to ports 513-1, 513-2, and 513-3. And, computer executable instructions are executed to maintain taggedness for ports 513-1, 513-2, and 513-3 in VLAN 1, VLAN 2, and VLAN 3. The same is illustrated in the example embodiment of FIG. 5 at 514-1 and 514-2. Hence, in this example embodiment, 4 VLACP trunks are formed, one for each of VLAN 1, VLAN 2, VLAN 3, and VLAN 5 with 4 ports tagged for membership in each of the 4 VLACP trunks on each switch, e.g., ports 511-1, 511-2, 511-3, 511-4 on switch 501-1 and ports 513-1, 513-2, 513-3, 513-6 on switch 501-2.

Figure 6:
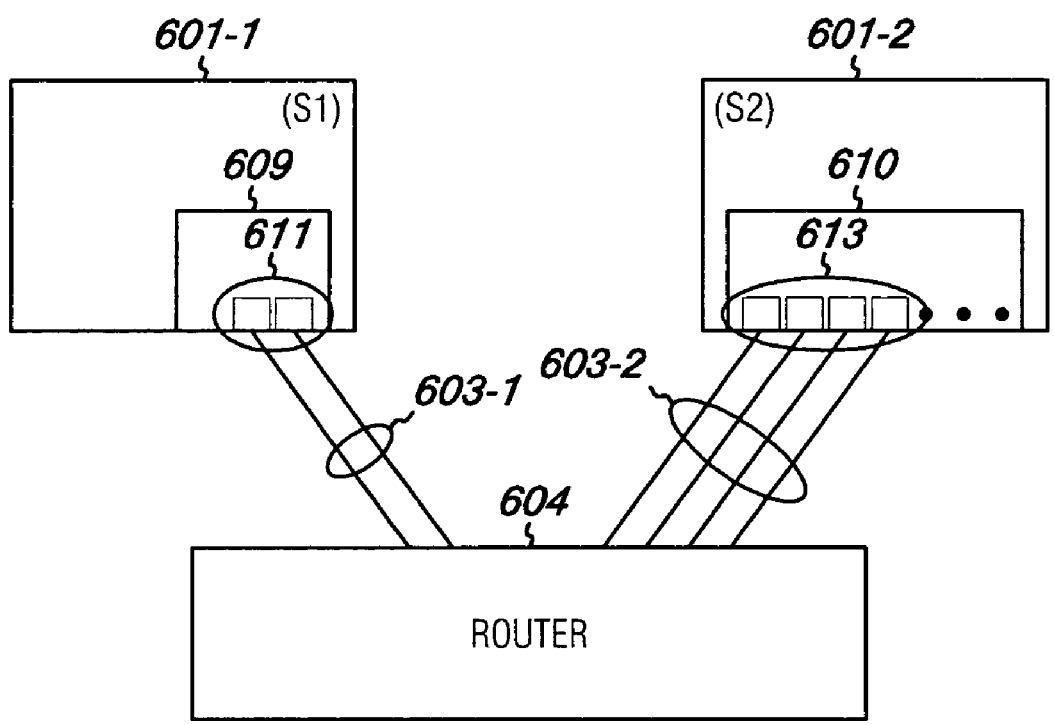
FIG. 6 illustrates an embodiment of VLAN aware dynamic LACP trunk formation when one VLAN connects to multiple network devices according to this disclosure.

FIG. 6 illustrates an embodiment of VLAN aware dynamic LACP trunk formation when one VLAN connects to multiple network devices according to this disclosure. The embodiment of FIG. 6 illustrates a pair of switches (S1 and S2), 601-1 and 601-2, respectively. Each of the switches 601-1 and 601-2 is connected to a router 604 via a physical link, e.g., 603-1 and 603-2 respectively, as can exist within a network such as the network shown in FIG. 1. The switches 601-1 (S1) and 601-2 (S2) include processor and memory resources as described in the above Figures (not shown here for ease of illustration) as well as logic circuitry associated with a network chip (ASIC), e.g., 609 and 610, each network chip having a number of physical ports, e.g., 611 and 613. The number of switches 601-1 (S1) and 601-2 (S2) can each also have LACP engine resources as described in the above Figures (not shown here for ease of illustration) which can execute instructions to provide LACP functionality. When physical link is established for ports 611 and 613, computer executable instructions are executed in the manner as has been described above in connection with FIGS. 3-5.

The example embodiment of FIG. 6 is useful to illustrate the operation of the VLACP embodiments when multiple network devices are connected with multiple ports, both on a single VLAN. According to various embodiments, when a single VLAN connects to multiple network devices, computer executable instructions are executed such that only one VLACP trunk is formed per VLAN. For example, when switch 601-1 and switch 601-2, both on a single VLAN and if switch 601-1 is connected to router 604 with two physical links and switch 601-2 is connected to router 604 with two physical links, then computer executable instructions are executed such that only one VLACP trunk will be formed. In various embodiments, the computer executable instructions are executed such that the first regular LACP trunk to form, either router 604 to switch 601-1 or router 604 to switch 601-2, will become the VLACP trunk for the single VLAN on which both switches 601-1 and 601-2 reside.

The example embodiment of FIG. 6 is additionally useful to illustrate the operation of the VLACP embodiments relative to trunk ordering. In the embodiment of FIG. 6, when switch 601-1 is connected via N physical links to router 604 and switch 601-2 is connected with N+x physical links to router 604, then computer executable instructions are executed to perform an action selected from the group of: (1) replacing an existing VLACP trunk with another VLACP trunk that has a larger number of ports up, e.g., as discussed in connection with FIG. 4; (2) supporting multiple VLACP trunks per VLAN; or (3) leaving the existing VLACP trunk in place.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A network device, comprising:
    a processor;
    a memory in communication with the processor;
    a network chip having a number of network ports for the device and having access to the processor and memory; and
    computer executable instructions storable in the memory and executable by the processor to enable link aggregation control protocol on a per port and per virtual local area network (VLAN) basis and to prevent changing the VLAN membership of a port when the port is linked to a trunk.

2. The device of claim 1, wherein the number of network ports includes a number of ports tagged for a VLAN membership in particular VLANs, wherein a given port may be tagged on a number of VLANs, but untagged on only one VLAN.

3. The device of claim 2, wherein the computer executable instructions can execute to add a taggedness of a port when the port is linked to a trunk.

4. The device of claim 2, wherein the program instruction can execute to prevent changing a taggedness of a port from untagged to tagged when the port is linked to a trunk.

5. The device of claim 2, wherein the computer executable instructions can execute to tag a port for a particular VLAN when the port is linked to a trunk.

6. A network device, comprising:
    a processor;
    a memory in communication with the processor;
    a network chip having a number of network ports for the device and having access to the processor and memory, wherein the number of network ports includes a number of ports tagged for a VLAN membership in particular VLANs, and wherein a given port may be tagged on a number of VLANs, but untagged on only one VLAN; and
    computer executable instructions for VLAN aware link aggregation control protocol (VLACP) storable in the memory and executable by the processor to enable link aggregation control protocol (LACP) on a per port and per virtual local area network (VLAN) basis and to prevent removing the VLAN membership of a port when the port is linked to a trunk.

7. The device of claim 6, wherein, when a port is configured for membership in one or more VLANs and has a physical link established, the computer executable instructions can execute such that each VLAN for which a given port is a tagged/untagged member may form its own VLACP trunk.

8. The device of claim 6, wherein the computer executable instructions can execute such that a port can be a VLAN member on a number of VLACP trunks.

9. A computer readable storage device having executable instructions which can be executed to cause a network device to perform a method, comprising:
    configuring a first port on a first network device as a tagged port with membership in a first virtual local area network (VLAN);
    configuring a second port on a second network device as a tagged port with membership in a second VLAN;
    establishing a physical link between the first port on the first network device and the second port on the second network device; and
    executing instructions to enable link aggregation control protocol (LACP) on a per port and a per VLAN basis and to prevent changing the VLAN membership of a port when the port is linked to a trunk.

10. The storage device of claim 9, wherein the method further includes executing instructions to tag the second port with membership in the first VLAN and allow the first port and the second port to participate in a trunk associated with the first VLAN.

11. The storage device of claim 10, wherein the method includes executing instructions to tag the second port with membership in the first VLAN while allowing the second port to retain membership in the second VLAN.

12. The storage device of claim 9, wherein the method includes executing instructions to tag the first port with membership in the second VLAN and allow the first port and the second port to participate in a trunk associated with the second VLAN.

13. The storage device of claim 9, wherein the method includes:
    configuring the first port on the first network device as a tagged port with membership in a first set of VLANs;

configuring the second port on the second network device with membership in a second set of VLANs; and executing instructions to tag each port with membership in both the first set of VLANs and the second set of VLANs to allow the first port and the second port to participate in a trunk associated with each VLAN.

14. The storage device of claim 13, wherein the configuring the second port on the second network device with membership in the second set of VLANs includes configuring the second port with membership in a VLAN that is not included in the first set.

15. The medium storage device of claim 9, wherein, when the first network device and the second network device support a different number of ports per trunk, the method includes:

executing instructions to form a larger trunk on a network device among the first and the second network devices that supports a larger number of ports; and if more ports are in the larger trunk than that of a number of ports supported by a given network device, removing a quantity of ports exceeding the number of ports supported by the given network device; and placing the removed quantity of ports in inactive mode.

16. The storage device of claim 15, wherein the method includes:

executing instructions to remove a port with a lowest speed when removing a quantity of ports exceeding the number of ports supported by the given network device; and executing instructions such that when a port goes down in the larger trunk an inactive port is moved to active mode to take its place.

17. The storage device of claim 16, wherein the method includes forming one trunk per VLAN.

18. The storage device of claim 9, wherein, when the first network device is connected via N physical links and the second network device is connected with N+x physical links, the method includes executing instructions perform an action selected from the group of:

replacing an existing trunk with another trunk that has a larger number of ports up;

supporting multiple trunks per VLAN; and leaving the existing trunk in place.

19. The medium storage device of claim 9, wherein the method includes:

running an instance of LACP on each VLAN; and enabling each port with LACP on a default basis.

* * * * *

UNITED STATES PATENT AND TRADEMARK OFFICE
CERTIFICATE OF CORRECTION

PATENT NO. : 7,684,410 B2  Page 1 of 1
APPLICATION NO. : 11/590050
DATED : March 23, 2010
INVENTOR(S) : Shaun C. Wackerly It is certified that error appears in the above-identified patent and that said Letters Patent is hereby corrected as shown below:

In column 13, line 13, in Claim 15, before "storage" delete "medium".

In column 14, line 20, in Claim 19, before "storage" delete "medium".

Signed and Sealed this

Third Day of August, 2010

David J. Kappos
*Director of the United States Patent and Trademark Office*